United States Patent [19]  
Dickert, Jr. et al.

[11] Patent Number: 4,655,942
[45] Date of Patent: Apr. 7, 1987

[54] CONTROLLED RELEASE DISPERSANT FOR CLAY-THICKENED, WATER-BASED DRILLING FLUIDS

[75] Inventors: Joseph J. Dickert, Jr., Yardley, Pa.; Israel J. Heilweil, Princeton, N.J.

[73] Assignee: Mobil Oil Corporation, New York, N.Y.

[21] Appl. No.: 697,550

[22] Filed: Feb. 1, 1985

[51] Int. Cl.$^4$ .................................................. C09K 7/02
[52] U.S. Cl. .................................. 252/8.5; 252/8.511; 252/8.514
[58] Field of Search ............... 252/8.5 A, 8.5 C, 8.5 P

[56] References Cited

U.S. PATENT DOCUMENTS

| | | |
|---|---|---|
| 2,650,905 | 3/1950 | Fordyce et al. |
| 2,718,497 | 9/1955 | Oldham et al. |
| 2,820,777 | 1/1958 | Suen et al. |
| 3,035,042 | 5/1962 | Hoyt. |
| 3,040,820 | 6/1962 | Gallus. |
| 3,323,503 | 6/1967 | Lummus et al. |
| 3,472,325 | 10/1969 | Lummus. |
| 3,558,545 | 1/1971 | Lummus. |
| 3,768,565 | 10/1973 | Persinski et al. |
| 3,921,733 | 11/1975 | Clampitt ........................ 252/8.5 X |
| 3,948,783 | 4/1976 | Szabo et al. |
| 3,953,342 | 4/1976 | Martin et al. |
| 4,043,921 | 8/1977 | Hessert et al. ..................... 252/8.5 |
| 4,055,502 | 10/1977 | Swanson ....................... 252/8.55 |
| 4,309,523 | 1/1982 | Engelhardt et al. |
| 4,322,301 | 3/1982 | Blackmore ....................... 252/8.5 |
| 4,411,800 | 10/1983 | Green et al. |
| 4,425,241 | 1/1984 | Swanson. |
| 4,442,011 | 4/1984 | Thaler et al. |
| 4,447,338 | 5/1984 | Lundberg et al. |
| 4,447,339 | 5/1984 | Detroit. |
| 4,451,389 | 5/1984 | Clear. |
| 4,455,240 | 6/1984 | Costello. |
| 4,455,241 | 6/1984 | Swanson. |
| 4,457,853 | 7/1984 | Detroit. |

FOREIGN PATENT DOCUMENTS 2044321 10/1980 United Kingdom.

Primary Examiner—Herbert B. Guynn
Attorney, Agent, or Firm—Alexander J. McKillop; Michael G. Gilman; Charles J. Speciale

[57] ABSTRACT

A clay-thickened, water-based drilling fluid composition demonstrating enhanced stability at the elevated temperatures encountered in deep drilling oil and gas recovery operations in described. The drilling fluid composition comprises an aqueous clay dispersion and a dispersing amount of a polymer crosslinked through a polyvalent metal cation.

21 Claims, 2 Drawing Figures

CONTROLLED RELEASE DISPERSANT FOR CLAY-THICKENED, WATER-BASED DRILLING FLUIDS

BACKGROUND OF THE INVENTION

This invention relates to drilling fluid compositions possessing increased stability at the down-hole temperatures encountered in deep drilling gas and oil recovery operations, e.g., temperatures of at least about 120° C. and above and preferably of at least about 150° C. and above at well depths of 15,000 ft. or more. More particularly, this invention relates to clay-thickened, water-based drilling fluids, containing a controlled release high temperature-stable polymeric thinner or dispersant.

It is the usual practice in well drilling operations to fill the well bore with a drilling fluid, or mud, which is circulated therein. The drilling fluid is generally pumped down through the drill stem, circulated about the drill bit and then returned to the surface through the annular passage between the drill stem and well wall.

As is known from U.S. Pat. No. 3,035,042, drilling fluid performs a number of essential functions in the drilling operation: it serves to cool and lubricate the drill bits, to carry the cuttings to the surface as the drilling fluid is circulated in and out of the well, to support at least part of the weight of the drill pipe and drill bit, to provide a hydrostatic pressure head to prevent caving of the walls of the well bore, to deposit on the surface of the well bore a filter cake which acts as a thin, semi-impervious layer to prevent undue passage therethrough of fluids, and to perform other functions as are well known in the drilling art. It is important that the drilling fluid system should be kept as simple and inexpensive as possible in order to avoid undue expense in the drilling of the well and enhance performance.

As noted in U.S. Pat. No. 4,411,800, one of the primary requisites of a satisfactory drilling fluid is its ability to inhibit the amount of fluid, normally water, which is lost into the porous strata through which the bore hole traverses. The loss of fluid causes the formation and the build-up of a cake deposit which, after a period of time, can cause sticking of the drill pipe and stoppage of the drilling operation. The drilling fluid must, therefore, be of a nature which permits minimum loss into the porous strata. Agents which impart such property are conventionally termed "thinners" or "dispersants".

The drilling flud components must also be stable and functional after subjection to elevated temperature conditions. In addition to the heat generated by the frictional forces of the drill bit, it is well known that the temperatures encountered in the bore hold are substantially above that found at the earth's surface. The deeper the bore hole is, the higher the temperature encountered. Drilling to greater depths has become common in today's quest for discovering new reserves. It is, therefore, desired to produce a composition capable of exhibiting stability and desired funtionality at the elevated temperatures commonly encountered in deep drilling operations. Materials that have been used in the past to control filtration rates of aqueous drilling fluids by plugging, producing cakes or similar methods, have included materials such as pregelatinized starch, sodium carboxymethylcellulose, sodium polyacrylates and lignites. Each of these materials have certain limitations. For example, lignite becomes ineffective in high salt concentrations.

Acrylic and methacrylic derivatives, such as those which are copolymerized with hydrocarbon substituted styrenes, such as alpha methyl styrene, para methyl styrene, 2,4-dimethyl styrene, and the like, have been utilized in drilling fluids. For example, U.S. Pat. No. 2,718,497 teaches the use of relatively high molecular weight polymers of these materials to control water loss characteristics of aqueous muds and clay dispersions. Additionally, U.S. Pat. No. 2,650,905 teaches the use of water soluble sulfonated polystyrene derivatives for filtration control in water-based drilling fluids.

Acrylic acid derivatives such as copolymers of acrylamide and sodium acrylate derivatives have been frequently used commercially as flocculants for drilling fluids, and are disclosed in U.S. Pat. Nos. 3,558,545 and 3,472,325. Similarly, a copolymer derived from acrylic acid and acrylamide is disclosed in U.S. Pat. No. 3,323,603 as flocculant for aqueous drilling fluids. U.S. Pat. No. 4,455,240 discloses a drilling mud based on an aqueous clay dispersion and a carboxylic functional polyampholyte, i.e., a polymer derived from the copolymerizations of a carboxylic functional monomer to provide anionic monomer groups, a cationic-containing monomer and optionally, a nonionic monomer.

Published British Application No., 2,044,321A discloses a copolymer drilling fluid additive prepared from (1) a meth(acrylamido alkyl sulfonic acid) or alkali metal salt thereof and (2) a (meth)acrylamide or N-alkyl (meth)-acrylamide. The copolymer may be cross-linked with a quaternary ammonium salt.

However, these and similar materials have been generally found to be unstable at the relatively high temperature conditions encountered in deep well drilling.

SUMMARY OF THE INVENTION

Figure 1:
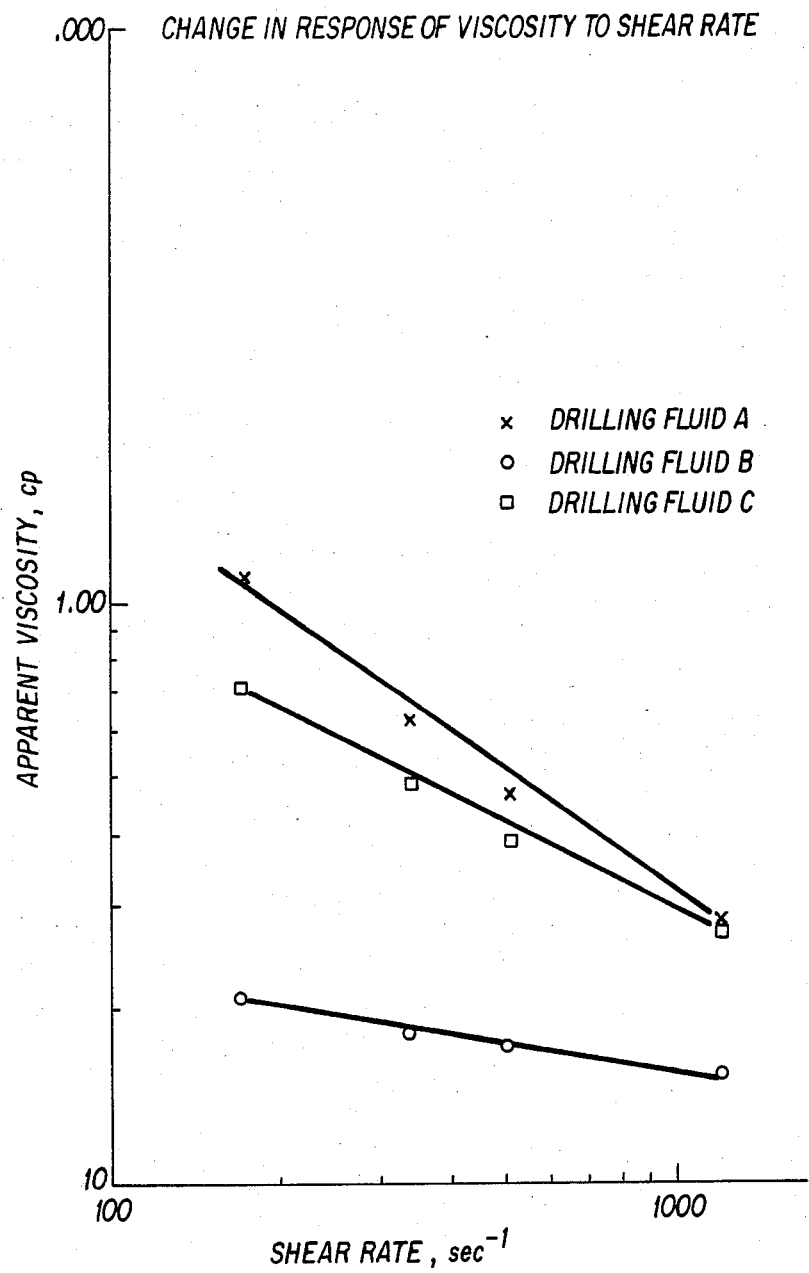
FIG. 1 is a graphical representation (logrithmic scale) of the change in response of the viscosity to shear rate for three drilling fluids, A, B, and C with Drilling Fluid C being representative of this invention.

The present invention is directed to a drilling fluid composition possessing enhanced stability at elevated temperatures, for example, temperatures in the regime of about 150° C. or above, while imparting a high degree of pseudoplastic and water loss controlling properties to clay-thickened, water-based systems and to gas and oil drilling operations employing the drilling fluid composition.

Briefly described, the drilling fluid composition of the present invention comprises an aqueous clay dispersion and a dispersing amount of a polymer crosslinked through a polyvalent metal cation, said polymer prior to crosslinking being derived from the polymerization of ethylenically unsaturated monomer units of the structural formula:

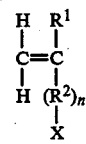

wherein $R^1$ is hydrogen, a phenyl group or an alkyl group of from 1 to 3 carbon atoms; $R^2$ is a straight or branched chain alkylene group of from 1 to about 12 carbon atoms or an arylene group of from 6 to about 12 carbon atoms; n is 0 or 1; and X is $-NR^3COR^4$ in which $R^3$ and $R^4$ each is the same or different and is hydrogen or alkyl of from 1 to about 6 carbon atoms, $-SO_3Y$ in which Y is OH or an alkali metal, $-COOY'$ in which $Y'$ is hydrogen or an alkali metal or $-CONHZ$ in which Z is hydrogen or the group $-R^5SO_3Y$ in which $R^5$ is straight or branched chain alkylene group of from 1 to 12 carbon atoms and Y is hydrogen or an alkali metal.

The term "polymer" as used herein and in the claims shall be understood to embrace homopolymers and copolymers, including block and graft copolymers containing one or more of the foregoing units and 1 or more other monomers copolymerizable therewith.

The crosslinked polymer provides an aggregate which slowly dissociates at elevated downhole temperatures thereby releasing the active dispersant species. This controlled release property of the dispersant component of the drilling fluid composition herein is responsible for maintaining the pseudoplastic character of the drilling fluid at the elevated temperatures associated with deep drilling operations, preserves the viscosity and other rheological properties of the drilling fluid so that its ability to lift cuttings out of the well is not significantly impaired, and imparts other desirable properties.

DESCRIPTION OF THE PREFERRED EMBODIMENTS

The clay dispersion can be any finely divided solid which is capable of being dispersed or suspended in an aqueous liquid vehicle. Ordinarily, such material will include hydratable clay or colloidal clay bodies such as Wyoming bentonite, commerical medium-yield drilling clays mined in various parts of the country such as in Texas, Tennessee and Louisiana, and those produced when clayey subsurface formations are drilled. Weighting materials added to increase specific gravity such as barites, iron oxide, and the like may also be included.

The aqueous medium may be fresh water such as is obtained from wells or streams; it may be salt water from the sea or from wells; or, it may even include oil-in-water emulsions, i.e., water which has become contaminated in some way with small quantities of oil, or to which such oil has been added to gain some desired advantage.

It is contemplated that the drilling muds of the invention may also contain other additives besides the polymers of the invention. Materials such as caustic, quebracho, lime and the like may be added to the drilling mud at the surface while other materials such as gypsum, shale and the like may be encountered in subsurface formations during drilling operations.

When employed in accordance with the invention, the polymer may be added directly to the drilling mud as a dry powder, as a slurry suspended in a suitable liquid, or as a solution in water or some other suitable solvent, and they may be incorporated therein at any convenient point in the mud circulation system. It may be desirable to employ a mixing device such as a cone and jet mixer or the equivalent for incorporating the additive in mud.

The crosslinked polymer employed in the drilling fluid of this invention is prepared from one or more ethylenically unsaturated monomer of the formula

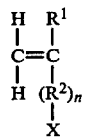

wherein $R^1$, $R^2$, n and X each have the aforestated meanings.

Examples of useful ethylenically unsaturated monomers which can be used to prepare the crosslinked polymer component of the drilling fluid herein include acrylic acid, methacrylic acid, vinyl sulfuric acid, vinyl acetic acid, allylacetic acid and 4-methyl-4-pentenoic acid. The preferred monomers are acrylic acid and methacrylic acid. Mixtures of the foregoing monomers can be used in preparing copolymers. In general, the polymers will be prepared in their entirety from the foregoing functional monomers but can also be prepared with up to about 40 weight percent of one or more compatible comonomers, e.g., acrylamide, methacrylamide, vinyl sulfonic acid, vinyl benzene sulfonic acid, ethyleneimine, acrylonitrile, methacrylonitrile, maleic anhydride, and the like. Conventional polymerization and copolymerization procedures which provide a molecular weight distribution within relatively narrow limits are contemplated. Average molecular weights of the polymer can vary widely with a range of from about 2,500 to about 1,000,000 or even higher providing suitable polymers. The preferred polymers possess average molecular weights in the range of from about 10,000 to about 100,000.

Examples of polymers which, following crosslinking with a polyvalent metal cation, can be employed with good effect herein include:

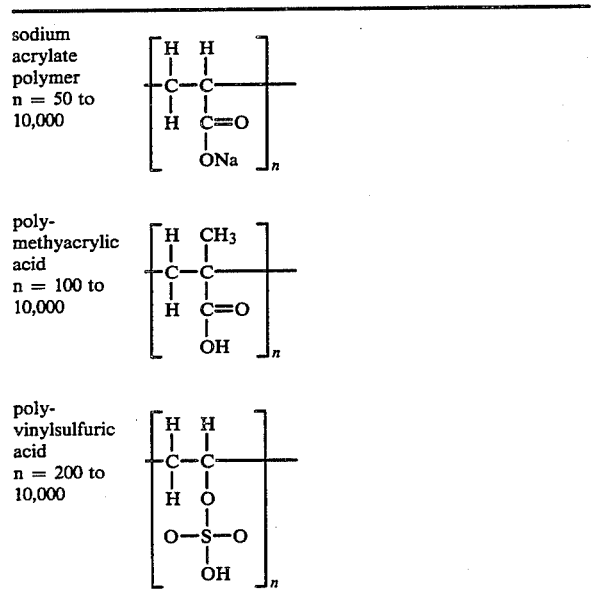

polystyrene sodium sulfonate
n = 100 to 5,000
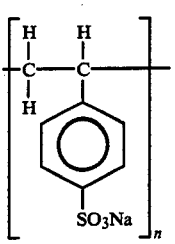

polyacrylamide
n = 200 to 10,000
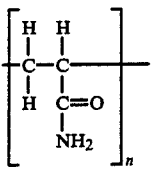

polymethacrylamide
n = 200 to 10,000
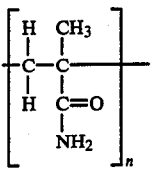

poly(2-acrylamido-2-methyl propane) sodium sulfonate (AMPS)
n = 100 to 5,000
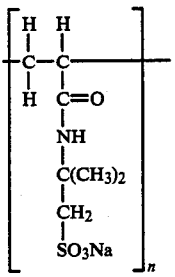

polyvinylacrylic acid sodium salt-(2-acrylamido-2-methyl-propane) sodium sulfonate copolymer
n + n' = 100 to 5,000
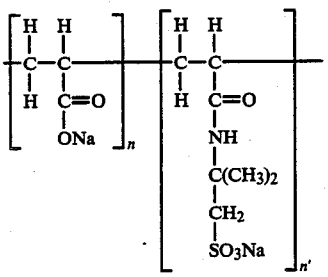

polyvinylacetamide-(2-acrylamido-2-methyl-propane) sodium sulfonate copolymer
n + n = 100 to 5,000
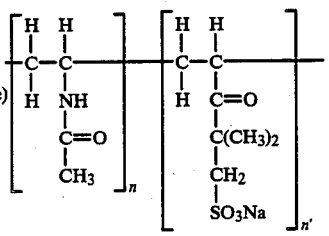

polymethacrylamide vinyl acetamide-(2-acrylamido-2-propane) sodium sulfonate terpolymer
n + n' + n" = 100 to 5,000
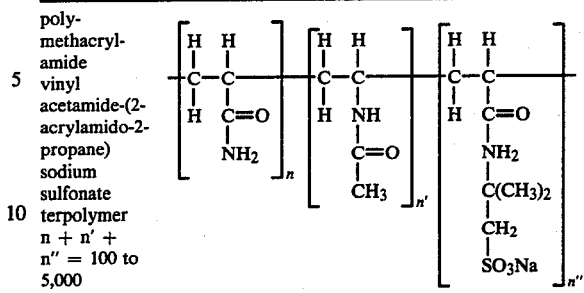

These and related polymers which are useful in preparing the ionically crosslinked polymeric dispersant component of the drilling fluid herein are disclosed in U.S. Pat. Nos. 3,768,565; 3,907,927; 3,926,718; 3,929,741; 3,948,783, 3,953,342; and 4,309,523, the contents of which are incorporated by reference herein.

The polyvalent metal cations through which the polymers are crosslinked to provide the slow-release dispersants of this invention can be selected from amongst a broad variety of divalent, trivalent, etc., metal cations which decrease the water solubility of the carboxylate polymer. Such metal cations include, for example, zinc, nickel, chromium, titanium, aluminum, copper and tin polyvalent cations. Divalent tin cations ($Sn^{++}$) have been found to provide especially advantageous results. Crosslinking can be obtained in a known and conventional manner, e.g., by contacting an aqueous solution of the polymer with the selected metal cations, e.g., derived from the soluble salt or hydroxides thereof. The degree of crosslinking can vary widely and is primarily a function of the amount of metal cation employed.

The quantity of the crosslinked polymeric dispersant to be employed in the drilling fluid of this invention will vary with circumstances over a reasonably wide range and the amount employed in a specific suspension or dispersion will depend on the circumstances and the characteristics of the drilling fluid treated. Ordinarily, satisfactory results with regard to water loss reduction will be obtained with quantities ranging between one and four pounds of dispersant per 42-gallon barrel of drilling mud. For optimum reduction in filtration rate with certain drilling muds, however, quantities up to 6 pounds of dispersant per 42-gallon barrel may be required. On the other hand, in some cases where, for example, only small improvement in filtration rate is desired, as little as 0.125 pound of the dispersant per barrel of mud will produce the desired effect. The exact amount to be added, as previously pointed out, depends upon the original character of the mud and on the properties desired. This can be determined as is customary in the field by simple tests at the time the addition is made.

EXAMPLE

By way of demonstrating the superior efficacy of the drilling fluid compositions of this invention for service at elevated temperature (200° C.), three drilling fluid formulations were prepared. Drilling fluid formulations A and B, respectively, one containing no polymer dispersant and one containing non-crosslinked polymer dispersant, were compared with drilling fluid formulation C which contains a metal cation crosslinked polymer and as such is illustrative of the invention.

Drilling Fluid A (No Polymer Dispersant)

Mix:
5600 ml H$_2$O
90 g sodium montmorillonite
540 g clay mix (50% by weight calcium montmorillonite, 20% by weight sodium montmorillonite, the balance with other clays)
Stir in mechanical mixer at 8500–9000 rpm
Allow to age about 48 hours
Add NaOH to pH=9.95
75.4 g "synthetic sea salt" (8000 ppm Cl$^-$)
3000 g Barite
2.5 ml of 36% NaOH to give pH=9.9
Density of mix=11.8 lb/gal This mud formulation was treated in a standard 600 ml, stainless steel, Parr "Mini-Reactor" under controlled temperature conditions either with or without stirring. Viscosity measurements were made on an NL Baroid viscometer at room temperature.

Drilling Fluid B (Containing Non-Crosslinked Carboxylate Polymer Dispersant)

This drilling fluid is identical to formulation A except that it contains Alcomer 72 (Allied Colloids, Inc. 50% by weight aqueous sodium acrylate polymer having a molecular weight of about 5,000) at the rate of 4 lb./bbl.

Drilling Fluid C (Containing Metal Cation-Crosslinked Carboxylate Polymer Dispersant)

This drilling fluid is identical to formulation B except that the Alcomer 72 is crosslinked with the equivalent (of the Alcomer 72) of Sn$^{++}$ as SnBr$_2$. (Aqueous polymer and tin solutions were combined prior to addition to the mud formation.)

Table 1 below sets forth viscometer data for a quantity of Drilling Fluid A relative to time at room temperature. As can be seen from these data, changes occur as the mixture ages, probably due to hydration of the clay and other chemical alterations.

TABLE 1

Drilling Fluid A - Viscosity Data (cp)
Result of "Soaking Time" (Room Temp.)

| RPM | SHEAR RATE (sec$^{-1}$) | FRESH MIX | 4 hr | 24 hr | 48 hr |
|---|---|---|---|---|---|
| 600 | 1020 | 34 | 32 | 31 | 29 |
| 300 | 510 | 63 | 56 | 52 | 47 |
| 200 | 340.6 | 87 | 78 | 72 | 63 |
| 100 | 170.3 | 159 | 138 | 126 | 111 |
| Plastic Visc (cp) | | 5 | 8 | 9 | 10 |
| Yield Pt (lb/100 ft$^2$) | | 58 | 48 | 43 | 37 |
| 10 sec GEL (lb/100 ft$^2$) | | 41 | 37 | 33 | 28 |
| 10 min GEL (lb/100 ft$^2$) | | 44 | 39 | 34 | 31 |

TABLE 2

Viscosity Data (cp) for Drilling Fluid A - Response to Heat

| RPM | SHEAR RATE (sec$^{-1}$) | UN-HEATED (aged 48 hrs) | 6 hrs. at 200° C. | 22 hrs. at 200° C. |
|---|---|---|---|---|
| 600 | 1020 | 31 | 50 | 55 |
| 300 | 510 | 51 | 75 | 77 |
| 200 | 340.6 | 68 | 93 | 96 |
| 100 | 170.3 | 123 | 135 | 138 |
| Plastic Visc (cp) | | 11 | 25 | 33 |
| Yield Pt (lb/100 ft$^2$) | | 40 | 50 | 44 |
| 10 sec GEL (lb/100 ft$^2$) | | 43 | 30 | 30 |
| 10 min GEL (lb/100 ft$^2$) | | 47 | 39 | 43 |

The data in Table 3 below show a large decrease in apparent viscosity of Drilling Fluid B brought about by the addition of Alcomer 72L (4 lb/bbl), a viscosity which then decreases on heating at 200° C. The plastic viscosity is relatively stable but the gel points are low.

TABLE 3

Apparent Viscosity (cp) for Drilling Fluid B

| RPM | SHEAR-RATE (sec$^{-1}$) | Apparent Viscosity, cp | | |
|---|---|---|---|---|
| | | 200° C., 28 hr | 200° C., 52 hr | 200° C., 70 hr |
| 600 | 1020 | 11 | 13.5 | 19.5 |
| 300 | 510 | 11 | 14 | 24 |
| 200 | 340.6 | 10.5 | 16.5 | 28.5 |
| 100 | 170.3 | 9 | 18 | 39 |
| Plastic Visc (cp) | | 11 | 13 | 15 |
| Yield Pt (lb/100 ft$^2$) | | 0 | 1 | 14 |
| 10 sec GEL pt (lb/100 ft$^2$) | | 0 | 1 | 3 |
| 10 min GEL pt (lb/100 ft$^2$) | | 1 | 2 | 6 |

Data for the Drilling Fluid C containing Alcomer 72L crosslinked with an equivalent amount Sn$^{++}$ are shown in Table 4 below. A gradual decrease in apparent viscosity is observed on heating. The gel point decreases to a very low value at about 52 hours and then gradually increases.

TABLE 4

Apparent Viscosity (cp) for Drilling Fluid C

| RPM | SHEAR RATE (sec$^{-1}$) | Apparent Viscosity, cp | | |
|---|---|---|---|---|
| | | 200° C., 28 hr | 200° C., 52 hr | 200° C., 70 hr |
| 600 | 1020 | 25 | 18 | 16 |
| 300 | 510 | 43 | 32 | 26 |
| 200 | 340.6 | 60 | 43.5 | 34.5 |
| 100 | 170.3 | 105 | 75 | 57 |
| Plastic Visc (cp) | | 7 | 4 | 6 |
| Yield Pt (lb/100 ft$^2$) | | 36 | 1 | 20 |
| 10 sec GEL pt (lb/100 ft$^2$) | | 21 | 1 | 12 |
| 10 min GEL pt (lb/100 ft$^2$) | | 20 | 2 | 12 |

In FIG. 1, the viscosity is logarithmically plotted against shear rate (sec$^{-1}$) for each of the drilling fluids. As can be seen, the presence of Alcomer 72L in Drilling Fluid A dramatically reduces the viscosity and the pseudoplastic character of the fluid as indicated by the slope approaching zero, a manifestation of more Newtonian behavior. Incorporation of Sn$^{++}$ cations as in Drilling Fluid C restores the pseudoplastic properties.

Figure 2:
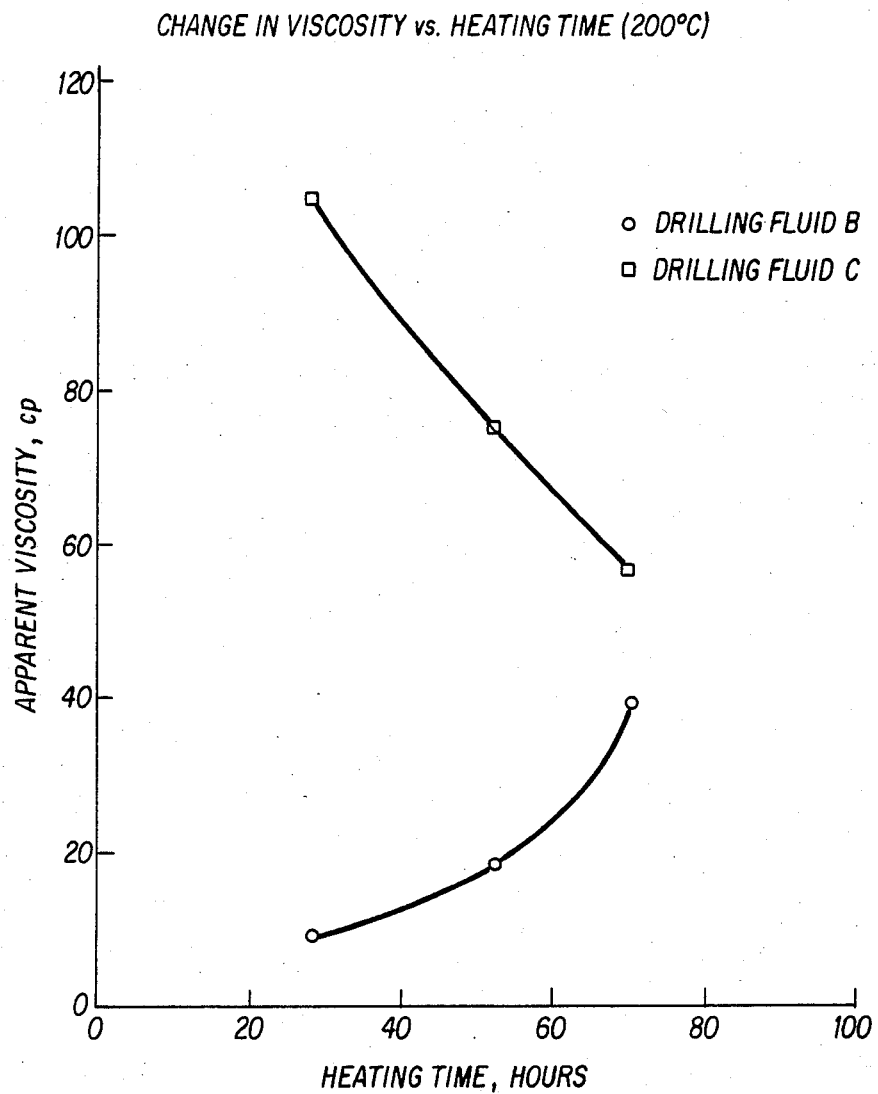
FIG. 2 is a graphical representation of the change in viscosity with heating time for Drilling Fluids B and C.

The change in apparent viscosity with time at 200° C. for Drilling Fluids B and C are shown in FIG. 2. With Drilling Fluid B, the viscosity, initially reduced from that of Drilling Fluid A, increased on heating, probably as the polymer thermally decomposed. Withh Drilling Fluid C, there was little initial loss of viscosity. On heating however, a gradual viscosity loss occurred and continued to at least 70 hours heating time. The crosslinked polymeric dispersant of Drilling Fluid C is only moderately soluble in the aqueous system at room temperature. It appears to dissolve slowly into the system as the temperature increases, either by hydrolysis, ligand dissociation, and/or other mechanism(s) thus slowly releasing the carboxylate polymer with its concomitant "thinning" effect.

What is claimed is:

1. A clay-thickened, water-based drilling fluid comprising:
   (a) an aqueous clay dispersion; and
   (b) a dispersing amount of a polymer crosslinked through Sn$^{++}$ cation, said polymer prior to crosslinking possessing an average molecular weight of from 2,500 to about 1,000,000 and being derived from the polymerization of at least 60 weight percent of ethylenically unsaturated monomer units of the structural formula:

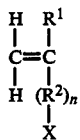

wherein $R^1$ is hydrogen, a phenyl group or an alkyl group of from 1 to 3 carbon atoms; $R^2$ is a straight or branched chain alkylene group of from about 1 to about 12 carbon atoms or an arylene group of from 6 to about 12 carbon atoms; n is 0 or 1; and X is $-NR^3COR^4$ in which $R^3$ and $R^4$ each is the same or different and is hydrogen or alkyl of from 1 to about 6 carbon atoms, $-COOY'$ in which $Y'$ is hydrogen or an alkali metal or $-CONHZ$ in which Z is the group $-R^5SO_3Y$ in which $R^5$ is a straight or branched chain alkylene group of from 1 to 12 carbon atoms and Y is hydrogen or an alkali metal, said drilling fluid being stable at down hole temperatures encountered in deep drilling gas and oil recovery operations.

2. The drilling fluid of claim 1 wherein said polymer prior to crosslinking contains up to 40 weight percent of copolymerized ethylenically unsaturated monomer units selected from the group consisting of acrylamide, methacrylamide, vinyl sulfonic acid, vinyl benzene sulfonic acid, acrylonitrile, methacrylonitrile and maleic anhydride.

3. The drilling fluid of claim 1 which is stable at a down hole temperature of at least about 120° C.

4. The drilling fluid of claim 1 which is stable at a down hole temperature of at least about 150° C.

5. The drilling fluid of claim 1 which is stable at the temperature encountered at a vertical drilling depth of at least about 15,000 feet.

6. The drilling fluid of claim 1 wherein $R^1$ is hydrogen or methyl, n is 0 and X is $-COOY'$.

7. The drilling fluid of claim 6 wherein $Y'$ is sodium.

8. The drilling fluid of claim 1 wherein $R^1$ is hydrogen or methyl, n is 0 and X is $-CONHZ$.

9. The drilling fluid of claim 1 wherein $R^5$ is $-C(CH_3)_2CH_2-$ and Y is sodium.

10. The drilling fluid of claim 1 wherein the polymer, prior to crosslinking, is prepared from two or more ethylenically unsaturated monomers of said structural formula.

11. The drilling fluid of claim 10 wherein the polymer, prior to crosslinking, is prepared by copolymerizing a first momomer in which $R^1$ is hydrogen or methyl, n is zero and X is $-COOY'$ or $-NR^3COR^4$ with a second monomer in which $R^1$ is hydrogen or methyl, n is 0 and X is $-CONHZ$.

12. The drilling fluid of claim 11 wherein $Y'$ is sodium, $R^3$ is hydrogen and $R^4$ is methyl in the first monomer and $R^5$ is $-C(CH_3)_2CH_2-$ and Y is sodium in the second monomer.

13. The drilling fluid of claim 1 wherein the average molecular weight of the polymer, prior to crosslinking, is from about 10,000 to about 100,000.

14. The drilling fluid of claim 1 containing from about 0.125 lb. to about 6 lb. of crosslinked carboxylate polymer per 42 lb. barrel of drilling fluid.

15. The drilling fluid of claim 1 containing a weighting material.

16. The drilling fluid of claim 1 wherein the clay dispersion is prepared with salt water.

17. A method of deep drilling a well into a subterranean formation which comprises circulating into the well, during drilling, a clay-thickened, water-based drilling fluid of claim 1.

18. A method of deep drilling a well into a subterranean formation which comprises circulating into the well during drilling, a clay-thickened, water-based drilling fluid of claim 2.

19. The deep drilling method of claim 17 carried out at a down hole temperature of at least about 120° C.

20. The deep drilling method of claim 17 carried out at a down hole temperature of at least about 150° C.

21. The deep drilling method of claim 17 carried out at the temperature encountered at a vertical drilling depth of at least about 15,000 feet.

* * * * *